US010709966B2

(12) United States Patent
Lin et al.

(10) Patent No.: US 10,709,966 B2
(45) Date of Patent: Jul. 14, 2020

(54) WEARABLE DEVICE WITH MOVEMENT INDICATOR, SYSTEM AND METHOD FOR MOVEMENT INDICATION

(71) Applicant: HONEYWLD TECHNOLOGY CORP., Hsinchu (TW)

(72) Inventors: Ching-Chang Lin, Hsinchu (TW); Jen-Chien Hsu, Hsinchu (TW); Anthony Carl Dean, Ellijay, GA (US)

(73) Assignee: HONEYWLD TECHNOLOGY CORP., Hsinchu (TW)

( * ) Notice: Subject to any disclaimer, the term of this patent is extended or adjusted under 35 U.S.C. 154(b) by 17 days.

(21) Appl. No.: 16/160,015

(22) Filed: Oct. 15, 2018

(65) Prior Publication Data

US 2020/0114254 A1    Apr. 16, 2020

(51) Int. Cl.
*A63F 13/212*        (2014.01)
*A63F 13/428*        (2014.01)
*A63F 13/44*         (2014.01)

(52) U.S. Cl.
CPC .......... *A63F 13/212* (2014.09); *A63F 13/428* (2014.09); *A63F 13/44* (2014.09)

(58) Field of Classification Search
USPC .......................................................... 463/36
See application file for complete search history.

(56) References Cited

U.S. PATENT DOCUMENTS

| 5,450,151 | A  | * | 9/1995 | Urata | ..................... | G03B 17/00 |
| | | | | | | 396/281 |
| 2012/0274593 | A1 | * | 11/2012 | Chiang | ................ | G06F 1/1626 |
| | | | | | | 345/173 |
| 2017/0156662 | A1 | * | 6/2017 | Goodall | ................ | G16H 40/63 |
| 2019/0364380 | A1 | * | 11/2019 | Khawand | ............ | H04B 17/318 |

* cited by examiner

*Primary Examiner* — Pierre E Elisca
(74) *Attorney, Agent, or Firm* — Li & Cai Intellectual Property (USA) Office

(57) ABSTRACT

A wearable device with movement indicator, a system and a method for movement indication are provided. The movement indication is implemented on the wearable device. The wearable device receives a movement instruction from a computing host. The movement instruction includes a direction signal that may be accompanied with further instructions such as strength and direction. The instructions are displayed through the movement indicator of the wearable device. A user who wears the wearable device moves in response to a moving instruction. A motion sensor of the wearable device senses a movement signal and obtains a moving direction. Other signals of strength and distance may also be obtained by the motion sensor. After that, the system can score the movement of the wearable device based on the original movement instruction.

12 Claims, 7 Drawing Sheets

WEARABLE DEVICE WITH MOVEMENT INDICATOR, SYSTEM AND METHOD FOR MOVEMENT INDICATION

FIELD OF THE DISCLOSURE

The disclosure is related to a wearable device, and in particular to a wearable device disposed with a movement indicator that is used to indicate a moving direction, a system with the wearable device, and a method therefor used to indicate the movement.

BACKGROUND OF THE DISCLOSURE

Dance Dance Revolution (DDR) is a dance video game running in an arcade machine that was developed by Konami, a Japanese computer game company. For a large-scale arcade station, a monitor is used to show arrows with stepping directions, e.g. up, down, left and right, through images of arrows. A player steps on a stage having pressure sensors to correspond with the arrows showing directions and the beat. One of the gaming goals is to cause the player to dance with the music. The gaming software running in the arcade machine receives sensed signals generated by the stage with the pressure sensors when the player steps thereon. When compared with the gaming instructions, the gaming software rates a correct proportion of steps of the player with a score.

The conventional DDR instructs the player the position to step on his feet through an indicator light lightened on the stage or displayed on a monitor. DDR scores by rating how well the player plays correctly steps on the correct positions. However, the DDR machine is restricted to be played at a fixed location and only few people can join the game at the same time.

One of the prior technologies is referred to U.S. Patent Pub. No. 20100035688 in connection with PCT/US07/84297 filed on Nov. 10, 2006 that discloses an electronic game that detects and incorporates a user's foot movement. A user puts on footwear with a motion sensor, e.g. an accelerometer, for sensing the user's foot movement. The footwear includes a wireless transmitter for transmitting sense signals. A system computes a series of foot movements of the user while receiving the sense signals. The system can therefore simulate the series of foot movements based on the sense signals and outputs a video.

SUMMARY OF THE DISCLOSURE

Different from the conventional DDR that utilizes a monitor to show the step directions or utilizes stage lights to indicate the stepping positions for the player, a wearable device with a movement indicator, a system and a method for movement indication of the disclosure are provided. The wearable device is such as a glove, a ring or a shoe that is able to indicate a moving direction of the player's hand or foot. One of the major technical features is to employ a movement indicator disposed on a wearable device to show the moving direction, strength and/or distance through lighting signals or a display. The wearable device uses a motion sensor to sense a moving direction, strength, and/or a distance and transmits the data via a communication circuit.

In one embodiment, the method for movement indication can be adapted to a wearable device with function of movement indication. The wearable device, such as shoes, receives a movement instruction from a computing host through a software sequence running in the wearable device and converts the movement instruction to a direction instruction or including instructions of strength and distance. A movement indicator of the wearable device is used to direct a moving direction. When the user follows the movement indicator of the wearable device, a motion sensor of the wearable device senses a movement signal and transmits the movement signal to the computing host. Then the computing host obtains a direction signal indicative of a moving direction from the movement signal. The moving direction is one of the factors used to rate whether the user is in compliance with the instructions.

Furthermore, when the movement instruction received by the wearable device includes a strength instruction, and the user acts according to the strength instruction, and the computing host obtains a moving direction according to the movement signal. In the meantime, the computing host can obtain the signals of strength or direction for rating the user's movement regarding the moving strength and/or distance.

In the wearable device with the movement indicator, the main circuit components include a controller, a motion sensor, a movement indicator, a communication circuit and a computing unit, such as, a digital signal processor and a memory, which can perform the method for movement indication. The computing host then receives a movement instruction via the communication circuit, and converts the movement instruction to a direction instruction. The movement indicator of the wearable device instructs a moving direction. When the user wears the wearable device and moves, the internal motion sensor senses a movement signal and generates a direction signal and/or the signals of strength and distance.

A system with the wearable device is provided. The system includes a computing host. The main circuit components of the wearable device are the controller, the motion sensor, the movement indicator, the communication circuit, the digital signal processor (DSP), and the memory.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
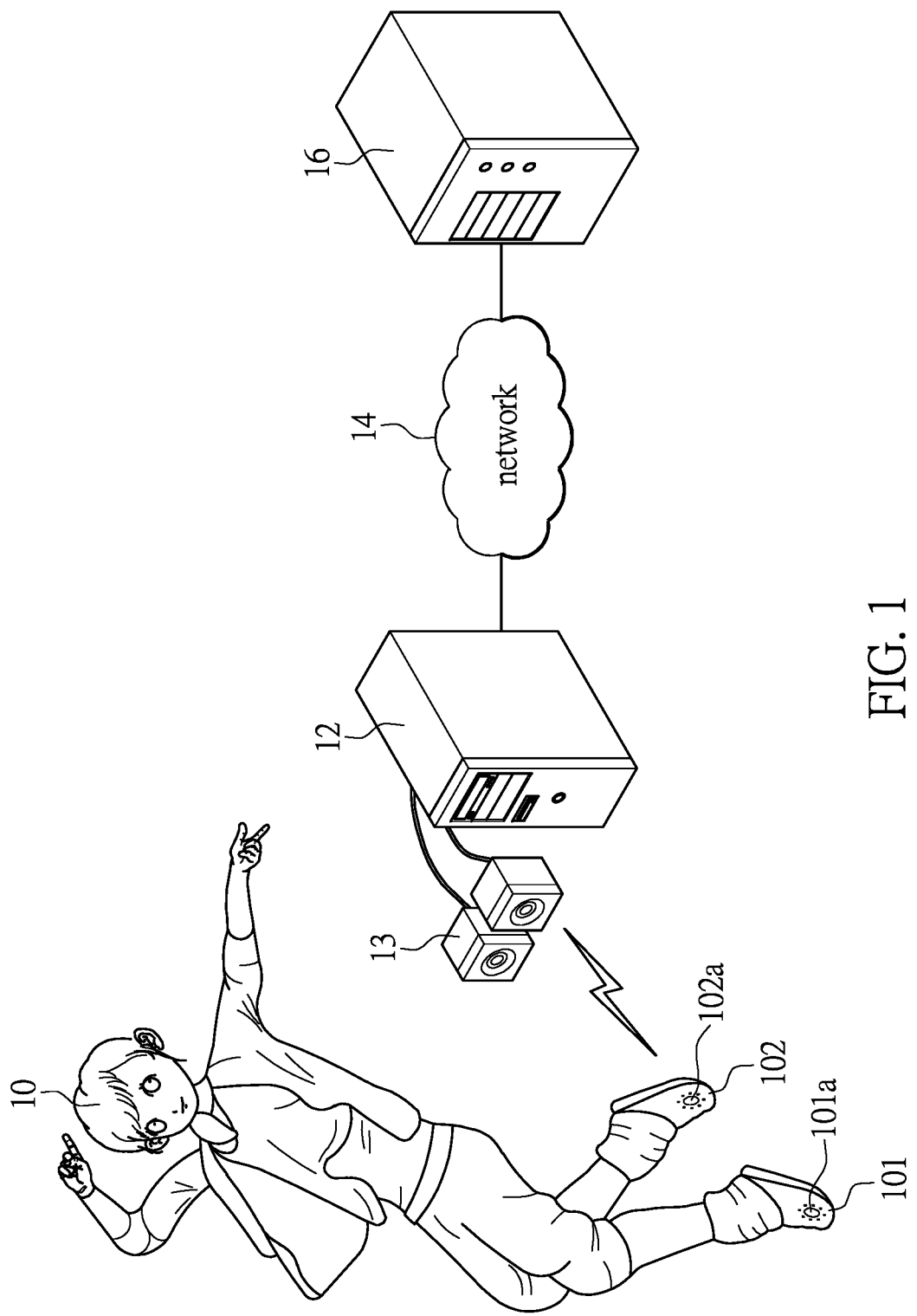
FIG. 1 shows a schematic diagram of a system that employs a wearable device with a movement indicator in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a wearable device with a movement indicator. The wearable device can be worn at a hand, foot or positioned at other positions on a human body, allowing people to act according to a movement instruction. The wearable device can be in a form of a pair of gloves schematically shown in FIG. 2A or shoes in FIG. 2B. It is characterized in that one or a pair of movement indicators are disposed on the wearable device for instructing a moving direction or including strength, distance and other actions. The movement indicator allows the user to act according to the movement indication. Therefore, the wearable with the movement indicator helps the user to exercise, dance or play. A system employing the wearable device with the movement indicator is also provided in the disclosure. The system incorporates a plurality of wearable devices for performing a movement indication method.

According to one of the embodiments, reference is made to FIG. 1, which shows a user 10 wearing the wearable device with the movement indicator. The user 10 wears a pair of shoes 101 and 102 with the movement indicators on his feet. The shoes 101 and 102 are disposed with movement indicators 101*a* and 102*a* respectively for visually indicating the moving direction for the shoes. The user 10 can follow the movement instruction using lights, images or the like made by the movement indicators 101*a* and 102*a*. A motion sensor in each of the shoes 101 and 102 is used to sense a movement direction, or including other movement signals such as strength, distance or stepping.

In the present embodiment, each of the shoes 101 and 102 includes a communication circuit that is able to receive the movement instruction transmitted from a computing host 12 via a wireless connection. A processing circuit in each of the shoes 101 and 102 then processes the movement instruction to acquire a direction instruction, or including a strength instruction, a distance instruction, or a stepping instruction. The movement indicators 101*a* and 102*a* then show the instructions visually to the user 10 to follow.

A sensing circuit (not shown in the diagram) of each of the shoes 101 and 102 is used to sense the movement of each of the shoes 101 and 102 so as to generate a series of movement signals. The movement signals are transmitted to the computing host 12. The computing host 12 can be connected with a cloud server 16 via a network 14. The cloud server 16 shown in the diagram can deliver the content such as music, game, rhythm sound, and/or the movement instructions to the shoes 101 and 102 through the computing host 12. The cloud server 16 also receives the sensing signals generated from different users' shoes.

In one embodiment, the cloud server 16 has a database that is used to manage the users' personal data, and also store the data of music, game, rhythm sound and the corresponding movement instructions. These data are delivered to the user's wearable device through the computing host 12. In the present example, the system includes the computing host 12 that connects with a speaker 13 for broadcasting the content of music, game or rhythm sound with the movement instruction to the shoes 101 and 102.

FIGS. 2A through 2D show the schematic diagrams depicting the wearable device with the movement indicator according to one embodiment of the disclosure.

Figure 2A:
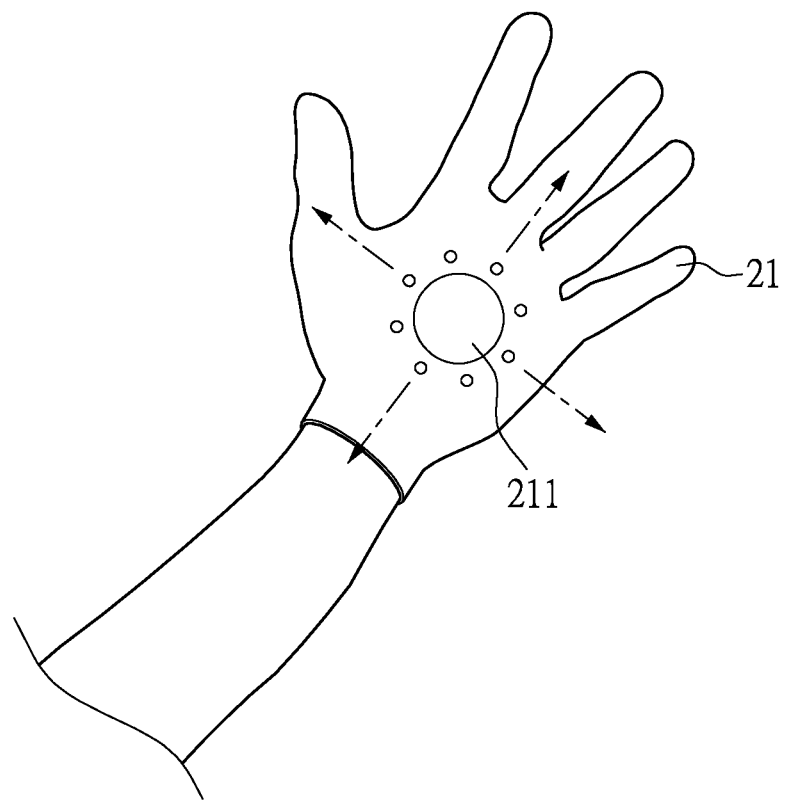
FIGS. 2A to 2D show the schematic diagrams depicting the wearable device with the movement indicator according to the embodiments of the disclosure.

The wearable device schematically shown in FIG. 2A is a glove 21. The glove 21 is disposed with a movement indictor 211 at the position forward to the user's eyes. The movement indictor 211 indicates various moving directions using several LEDs. In one aspect, the LEDs are used to instruct the user to move with a moving direction, strength, an amplitude/distance, and/or a waving action by means of flickering the light or modulating the color or brightness. In other embodiments, the movement indication can be performed by the various displays, an illuminator, vibration or sound.

Figure 2B:
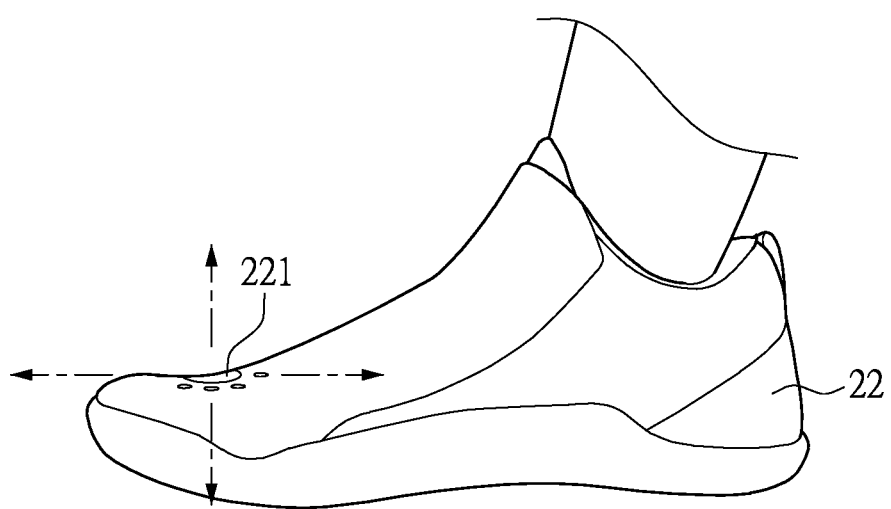

In FIG. 2B, a movement indictor 221 is disposed on a shoe 22. The movement indicator 221 utilizes LEDs to indicate the moving direction, stepping, moving distance, and/or strength by flickering, modulating color or brightness or the like.

Figure 2C:
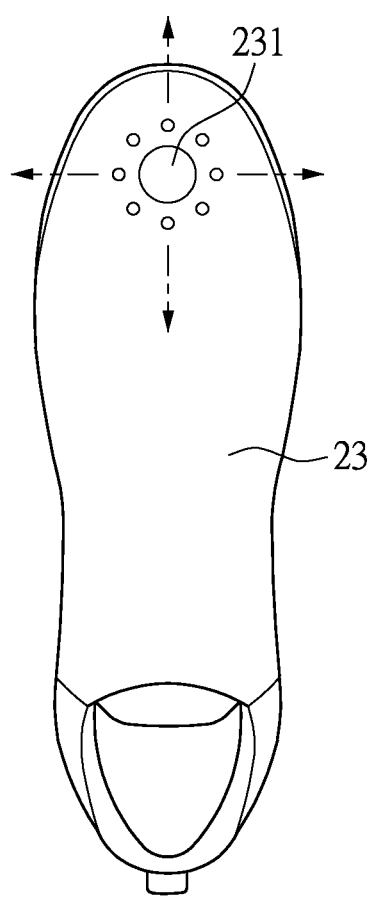

FIG. 2C shows a shoe 23 and a movement indicator 231 disposed thereon. The movement indicator 231 can be embodied by LEDs that are used to show the directions including front, rear, left and right. Further, the LEDs can also indicate more precise movement by increasing the number of LEDs and their arrangement.

Figure 2D:
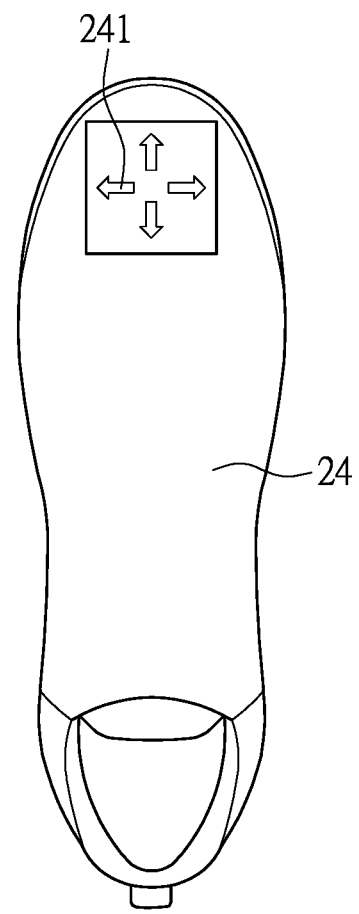

FIG. 2D shows a schematic diagram depicting a shoe 24 with a movement indicator 241. The movement indicator 241 can be a display such as an LCD, an LED panel, or an OLED panel that is used to show various moving directions. For example, a moving direction, an stepping action, a moving distance and/or strength can be indicated by changing colors, brightness or patterns displayed on the display. It should be noted that the wearable device with the movement indicator may not be limited to the embodiments of the disclosure.

The system for movement indication using the wearable device can establish a series of movement instructions in cooperation with music, games or sounds. After the movement instruction is performed by a computer, a direction instruction, a strength instruction, a distance instruction, a stepping instruction or a waving instruction can be obtained. The movement indicator disposed on the wearable device is then used to indicate a direction, strength, a moving distance, a stepping action for the shoes or a waving action for the gloves to the user by visual indication, vibration or sound. After that, the internal sensor of the wearable device generates sensing data that is configured to be transmitted to a cloud server or a local computing host by a wireless communication technology.

In an exemplary example, the wearable device can be in a form of a ring worn on a finger. However, the ring may be disposed with a speaker or LEDs for indicating the instruction, instead of a display. The wearable device includes a motion sensor, e.g. an accelerometer such as G-sensor or a gyroscope, that to sense the movement of the wearable device. Further, the wearable device can communicate with an external device, for example receiving a movement instruction or transmitting movement signal by WiFi™ or Bluetooth™ communication protocol.

The movement indicator can be a light that is used to indicate the moving distance and strength instruction through a brightness or light/dark signal of the light. The moving distance may be a stepping distance or a gesture. The movement indicator can be a display panel that can be used to indicate the moving direction, distance or strength through patterns, so that the movement likes dancing or exercise with a rhythm. Further, the wearable device can include a built-in speaker that plays the music provided by the system, and the movement instruction can also be obtained at the same time.

Figure 3:
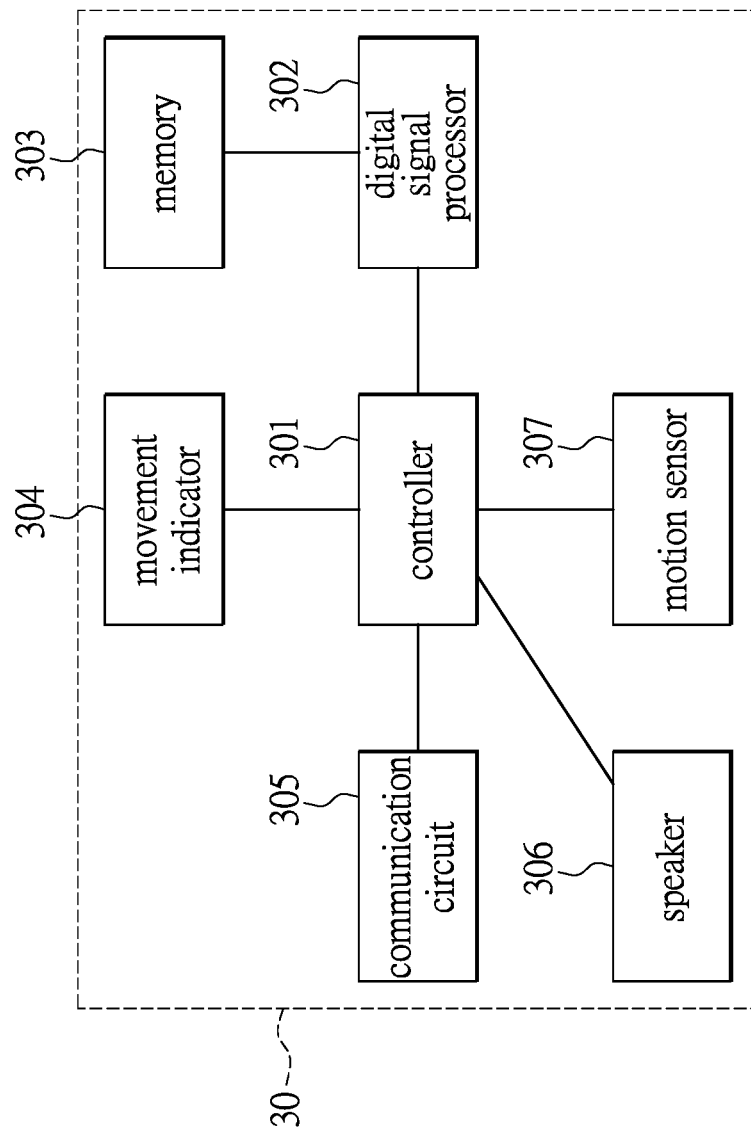
FIG. 3 shows a block diagram of circuitry of the wearable device according to one embodiment of the disclosure.

Reference is made to FIG. 3 that shows a schematic diagram depicting a circuit block diagram of a wearable device 30 with the movement indicator according to one embodiment of the disclosure. The main circuit components of the wearable device 30 include a controller 301 for controlling the wearable device 30 and other circuit components that are electrically connected with the controller 301 such as a motion sensor 307, which can be implemented by an accelerometer or a gyroscope to sense a direction of movement of the wearable device 30, wherein the related information including the direction and the time of the movement or the moving strength, moving distance, stepping or waving with respect to the movement may also be included.

The wearable device 30 includes a movement indicator 304 that is used to indicate a moving direction, a moving strength, a moving distance, a stepping action or a waving action that is converted from a movement instruction. The movement indicator 304 can be a display or an assembly of lights that can visually indicate the moving direction. Furthermore, the movement indicator 304 may use sound or vibration to instruct direction, strength, distance or other actions to the user wearing the wearable device.

When the user moves the wearable device 30 according to the movement instruction instructed by the movement indicator 304, the wearable device 30 senses the movement via the motion sensor 307. The motion sensor 307 senses the moving direction, the strength, the moving distance, stepping action or waving action of the wearable device 30. A movement signal related to a direction, strength, a distance, stepping or waving is generated.

The wearable device 30 includes a communication circuit 305 that is used to communicate with other wearable device or a computing host. For example, by the communication circuit 305, the wearable device 30 can receive the movement instruction from the computing host and transmit the movement signal generated by the motion sensor 307. The movement signal is mainly a direction signal, strength signal and/or distance signal. Furthermore, the movement signal also indicates stepping or waving action.

The wearable device 30 includes a digital signal processor 302 and a memory 303. The digital signal processor 302 is such as a central processor of the wearable device 30, and in which a method for movement indication is performed. In the method, the movement instruction allows the wearable device 30 to obtain the parameters of a direction, strength or a distance with respect to the movement. The movement indicator 304 of the wearable device 30 indicates the direction, strength or the distance obtained from the movement instruction. The motion sensor 307 of the wearable device 30 can therefore sense the direction of movement. Furthermore, the digital signal processor 302 can calculate the strength and/or the distance based on the direction and a time parameter. The data relating to the direction, strength and/or distance are then transmitted to the computing host. The information of direction or the like can be obtained by the digital signal processor 302 of the wearable device 30 according to the movement signal generated by the motion sensor 307, or calculated by the computing host when the wearable device 30 transmits the movement signal to the computing host.

According to another embodiment of the disclosure, the wearable device 30 can have a speaker 306 for playing the music or sounds transmitted from the cloud server or the computing host. The wearable device 30 can therefore receive the movement instruction with the data of music or sounds at the same time.

Figure 4:
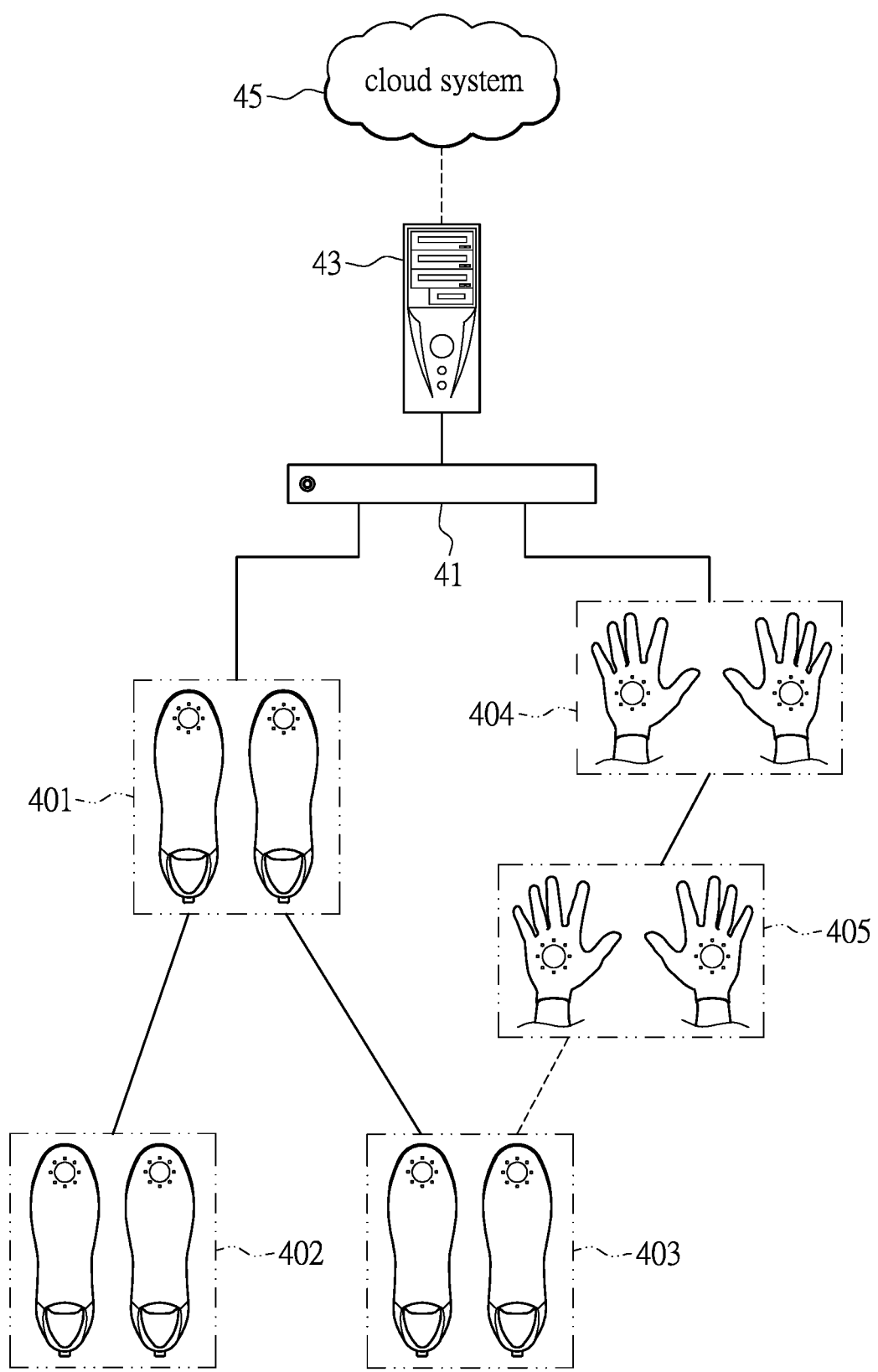
FIG. 4 shows a schematic diagram depicting a system framework of the system employing the wearable device with the movement indicator according to one embodiment of the disclosure.

FIG. 4 shows a schematic diagram depicting a system framework of the system utilizing the wearable device with movement indicator.

During the operation of the system with the wearable device, the user moves according to the music, sounds or game provided by the system. At the same time, the movement indicator instructs the user according to a movement instruction. The movement indicator is used to instruct the user a direction of movement, and then the motion sensor is used to sense the movement. After that, a software program performed in an external device or a server connected to the wearable device analyzes and scores the movement. The movement signal is used to be compared with the movement instruction representing direction, strength, distance, stepping action and/or waving action that is provided by the computing host so as to score the user's performance.

The system provides a computing host 43 at the user end for connecting with a plurality of wearable devices within a LAN. The computing host 43 may transmits the movement instruction to the plurality of wearable devices and receive the movement signal from those wearable devices via a gateway 41. A cloud system 45 may be provided in the system for connecting with a plurality of computing hosts at different ends. The cloud system 45 is able to transmit instructions and the content such as music and games to the wearable devices in different LANs. The cloud system 45 can record the data received from the wearable devices, score and rank them.

In the present example, the computing host 43 connects with the various wearable devices in the LAN via the gateway 41. The shoe-like wearable devices are shown in the diagram as a first wearable device 401, a second wearable device 402 and a third wearable device 403 that can be interconnected with each other. In addition, there are other glove-like wearable devices shown as a fourth wearable device 404 and a fifth wearable device 405 that are also interconnected.

During the operation of the system, the cloud system 45 transmits music, games and the corresponding movement instruction to the computing host 43. The computing host 43 not only forwards the music or games, but also forwards the movement instruction to the abovementioned wearable devices 401 to 405. The embodiment discloses the wearable devices 401 to 405 in the LAN communicate with the computing host 43 via the gateway 41 individually. Furthermore, the wearable devices 401 to 405 can be in point-to-point communication with each other to transmit the movement instructions and their movement signals more efficiently.

In the present example, both the second wearable device 402 and the third wearable device 403 are connected with the first wearable device 401 and then connects with the gateway 41 via the first wearable device 401. The fifth wearable device 405 connects to the gateway 41 via the fourth wearable device 404. The wearable devices 401 to 405 can also be interconnected with each other and exchange the movement instructions, the movement signals or the content such as music or games under a specific communication protocol. Thus, when the music and the corresponding movement instructions in the computing host 43 are transmitted to all the wearable devices in the LAN, since the wearable devices can communicate with each other, the technical purpose of indicating the movement direction by the wearable devices can be realized in a wider range of network.

Further, when the cloud system 45 or the local computing host 43 provides the content such as music, rhythms or games, the content can be streamed to the wearable devices 401 to 405. The wearable device includes a specific memory such as RAM/SRAM/DRAM that is used to store the data and also used to temporarily save the movement instructions and sensed signals.

It should be noted that the central processor of each of the wearable devices 401 to 405 can itself calculate the direction according to the movement signal sensed by the internal motion sensor and then transmit the direction signal to the computing host 43 according to one embodiment of the disclosure. Alternatively, each of the wearable devices 401 to 405 can transmit the raw data, and calculates the direction and score it according to the movement signal.

More particularly, it is different from the conventional DDR utilizing a monitor and a stage with sensors to instruct the user's movement. The movement indicator of the wearable device of the disclosure is used to instruct the user a direction, strength, a distance or an action of movement by lights or a display. The operation of the wearable device with the movement indicator and its corresponding system are not restricted to the restriction of the site.

Figure 5:
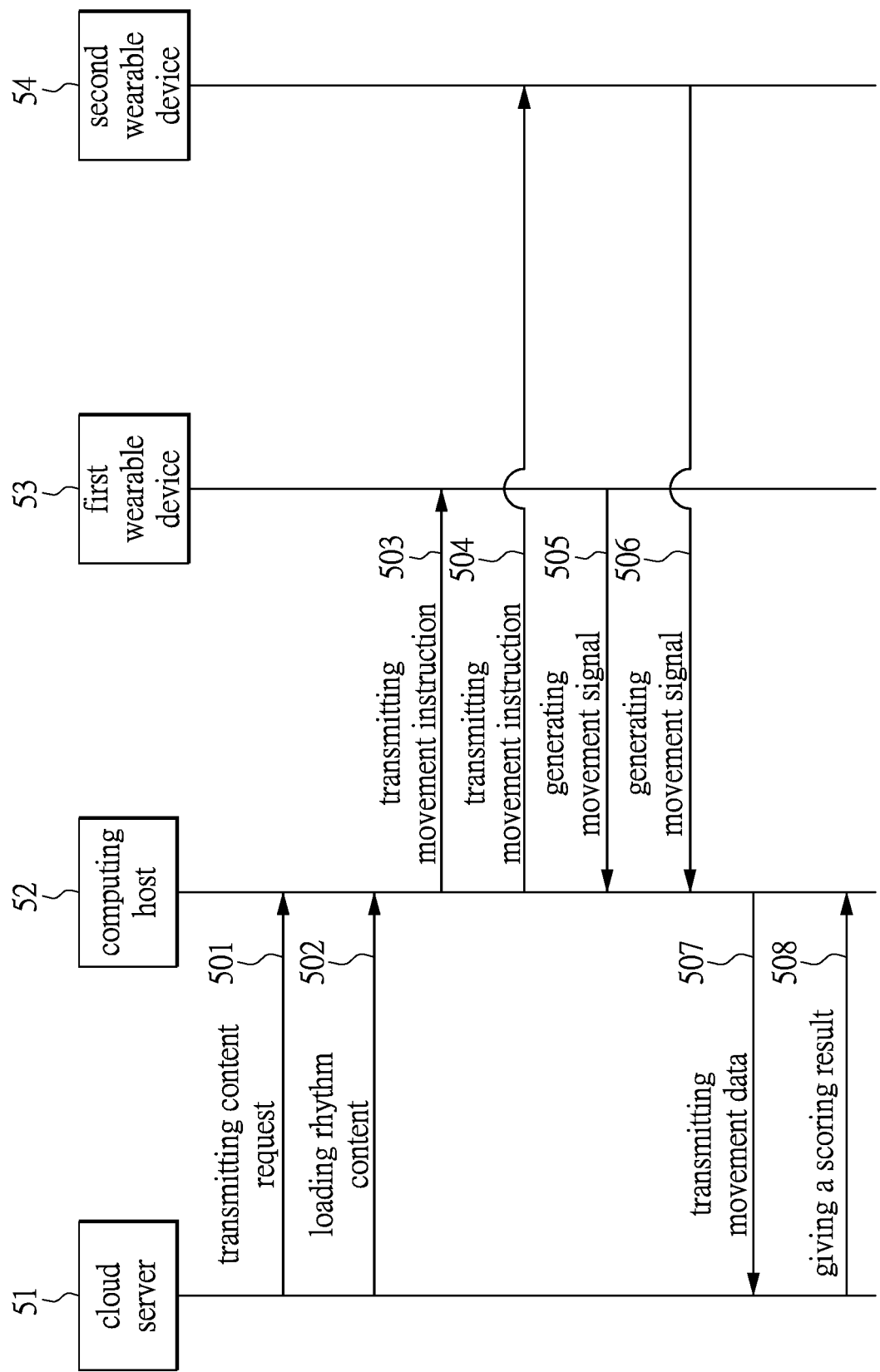
FIG. 5 shows a flow chart describing a method for movement indication using the wearable device with the movement indicator according to one embodiment of the disclosure.

Reference is made to FIG. 5 that shows a flow chart describing the method for movement indication using the wearable device with the movement indicator in one embodiment of the disclosure. The method is adapted to the system including a cloud server 51, a computing host 52 and multiple wearable devices. A first wearable device 53 and a second wearable device 54 are exemplarily included in the flow chart. The computing host 52 connects with the cloud server 51. The cloud server 51 acts as a workstation that provides the acoustic signals of rhythms and can be used to receive direction signals and corresponding time within a period of time. The strength or distance can be calculated according to the information such as the direction and time. The system can give a score after comparing the movement signals with the movement instruction.

In the process, the computing host 52 generates a request signal according to a user's request and transmits the request signal to ask for content from the cloud server 51 (step 501). The cloud server 51 loads a rhythm content (step 502) that includes the movement instructions corresponding to the content. The computing host 52 transmits the content and the corresponding movement instructions to each wearable device, for example the first wearable device 53 (step 503). The movement instructions and the corresponding instructions are also transmitted to the second wearable device 54 (step 504). RF serial or parallel communication can be used to transmit the instructions to more than one device.

In the next period of time, the user wearing the wearable device (53, 54) starts moving the wearable device according to the direction instruction. In the meantime, if the wearable device (53, 54) also receives the time for the direction instruction, the strength instruction, distance instruction, stepping instruction or waving instruction can be obtained. The motion sensor of the wearable device generates a movement signal when the user performs the action according to these instructions. Such as in step 505, the first wearable device 53 generates a movement signal (step 505). The movement signal is transmitted to the computing host 52 under a specific communication protocol. Also, the second wearable device 54 generates a movement signal (step 506) and transmits the movement signal to the computing host 52.

After that, the computing host 52 receives the movement signal from each of the wearable devices (53, 54), and the movement signal is used to obtain the movement data that is transmitted to the cloud server 51 (step 507). A software sequence running in the cloud server 51 obtains the signals of direction, strength, distance or other actions according to the movement signals received from the wearable devices (53, 54) within a period of time. So that, the cloud server 51 scores a result after a comparison between the movement signals with the original movement instructions is obtained. The scoring result can be transmitted to the computing host 52 (step 508) to be provided to the users.

Figure 6:
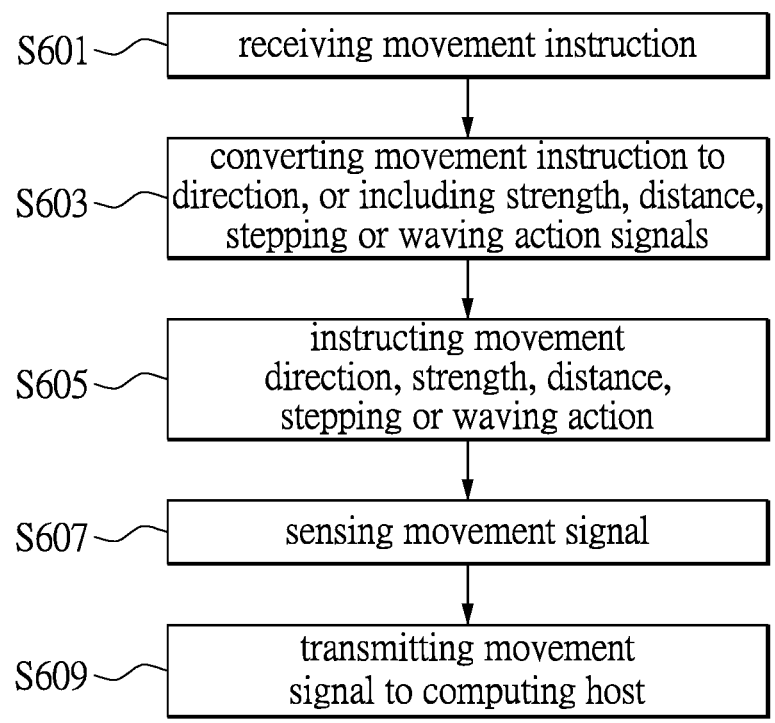
FIG. 6 shows another flow chart describing the method for movement indication using the wearable device with the movement indicator according to one embodiment of the disclosure.

The flow chart depicted in FIG. 6 describes the method for movement indication with the wearable device with the movement indicator according to another embodiment of the disclosure.

The system instructs the user with the moving direction, strength, distance and/or other actions through the movement indicator of the wearable device. The motion sensor of the wearable device is used to obtain the direction, strength, distance, and/or other actions of the movement. The method is not restricted to any specific site. The wearable device includes a digital signal processor that is able to process the data, a communication circuit that allows the device to communicate with other devices, and a communication circuit that is used to connect with the computing host or the cloud system. The wearable device can act as an available node within this system. The data generated by the wearable device can be obtained the system.

In the process for performing movement indication in the digital signal processor of the wearable device, in step S601, the wearable device firstly receives the movement instruction transmitted from the cloud server or the computing host. After that, in step S603, a program running in the digital signal processor converts the movement instruction to a direction signal, strength signal, stepping signal or waving signal. In step S605, the movement indicator of the wearable device is used to instruct the direction, strength, distance or an action such as stepping or waving by lights, display, vibration or sound. The user can follow the indication made by the movement indicator to move the wearable device. In step S607, the motion sensor inside the wearable device senses the movement and generates the movement signal. The movement signal is then transmitted to the computing host, such as in step S609.

In conclusion, the embodiments of the disclosure show the wearable device with the movement indicator, and the method for movement indication using the wearable device. The related system can be adapted to the use of exercise, training and gaming. Different from the conventional DDR having the specific restrictions on a site, the number of users, equipment and even a direction which the users have to face toward, the system of the disclosure is provided for multiple users who wear the wearable devices to use at any place and to any direction.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for movement indication, adapted to a wearable device with a movement indicator, comprising:
   receiving a movement instruction from a computing host by the wearable device;
   converting the movement instruction to a direction instruction, and indicating a direction by the movement indicator of the wearable device;
   sensing a movement signal of the wearable device by a motion sensor of the wearable device; and
   computing a direction signal by the wearable device in response to the movement signal, or transmitting the movement signal to the computing host by the wearable device for obtaining the direction signal according to the movement signal.

2. The method as recited in claim 1, wherein, when the direction instruction is obtained according to the movement instruction, in the meantime a time related to the direction instruction is obtained, so that a strength instruction or including a distance instruction is obtained.

3. The method as recited in claim 2, wherein the computing host receives the movement signal obtained within a period of time and generates the time related to the movement signal; in addition to the direction signal, a signal of strength or distance is obtained and then a score is executed by comparing with movement instructions occurred within the period of time.

4. A wearable device with a movement indicator comprising:
   a controller;
   a motion sensor, electrically connected with the controller, and used to sense a direction of movement of the wearable device;
   a movement indicator, electrically connected with the controller, and used to indicate a direction;
   a communication circuit, electrically connected with the controller, and used to communicate with other wearable device or a computing host;
   a digital signal processor and a memory, electrically connected with the controller, wherein the digital signal processor performs a movement indication method including:
      receiving a movement instruction from the computing host via the communication circuit;
      converting the movement instruction to a direction instruction and indicating the direction by the movement indicator;
      sensing a movement signal of the wearable device by the motion sensor; and
      obtaining a direction signal according to the movement signal.

5. The device as recited in claim 4, wherein the motion sensor is one selected from an accelerometer and a gyroscope or one of them.

6. The device as recited in claim 5, wherein the movement indicator is also used to indicate a moving strength, a moving distance, a stepping action or a waving action.

7. The device as recited in claim 4, wherein the movement indicator is a display or a device composed of a plurality of lights for indicating various moving directions.

8. The device as recited in claim 7, wherein the movement indicator is also used to indicate a moving strength, a moving distance, a stepping action or a waving action.

9. A system employing a wearable device with a movement indicator, comprising:
   a computing host;
   one or more wearable devices with a movement indicator, wherein each wearable device includes:
   a controller;
   a motion sensor, electrically connected with the controller, and used to sense a direction of movement of the wearable device;
   a movement indicator, electrically connected with the controller, and used to indicate a direction;
   a communication circuit, electrically connected with the controller, and used to communicate with the computing host;
   a digital signal processor and a memory, electrically connected with the controller, wherein the digital signal processor performs a movement indication method including:
      receiving a movement instruction from the computing host via the communication circuit;
      converting the movement instruction to a direction instruction, and indicating the direction by the movement indicator;
      sensing a movement signal of the wearable device by the motion sensor; and
      computing a direction signal in response to the movement signal or transmitting the movement signal to the computing host; and
      calculating the direction signal by the computing host in response to the movement signal.

10. The system as recited in claim 9, wherein the plurality of wearable devices are communicated with each other.

11. The system as recited in claim 9, wherein the system connects with a cloud server via the computing host, and provides acoustic signals with a rhythm, and receives the direction signal and a time related to the direction signal obtained within a period of time.

12. The system as recited in claim 11, wherein the system receives a strength signal or a direction signal and compares the movement instruction and the signals within the period of time to score.

* * * * *